(12) United States Patent
Blaber et al.

(10) Patent No.: US 9,672,848 B2
(45) Date of Patent: Jun. 6, 2017

(54) MULTIPIECE NEAR FIELD TRANSDUCERS (NFTS)

(71) Applicant: SEAGATE TECHNOLOGY LLC, Cupertino, CA (US)

(72) Inventors: Martin Blaber, Plymouth, MN (US); Tong Zhao, Eden Prairie, MN (US); Justin Brons, Savage, MN (US); Michael Kautzky, Eagan, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/167,233

(22) Filed: May 27, 2016

(65) Prior Publication Data

US 2016/0351211 A1 Dec. 1, 2016

Related U.S. Application Data

(60) Provisional application No. 62/167,316, filed on May 28, 2015.

(51) Int. Cl.
*G11B 5/127* (2006.01)
*G11B 5/31* (2006.01)
(Continued)

(52) U.S. Cl.
CPC ............ *G11B 5/314* (2013.01); *G11B 5/6082* (2013.01); *G11B 2005/0021* (2013.01)

(58) Field of Classification Search
CPC .... G11B 2005/0021; G11B 2005/0005; G11B 5/314; G11B 5/3903
(Continued)

(56) References Cited

U.S. PATENT DOCUMENTS

| 4,492,873 A | 1/1985 | Dmitriv |
| 5,482,611 A | 1/1996 | Helmer |

(Continued)

FOREIGN PATENT DOCUMENTS

| EP | 240088 | 10/1987 |
| EP | 0942072 | 9/1999 |

(Continued)

OTHER PUBLICATIONS

Al-Bayati et al., Junction Profiles of Sub keV Ion Implantation for Deep Sub-Quarter Micron Devices, IEEE, 2000, pp. 87-90.
(Continued)

*Primary Examiner* — Nabil Hindi
(74) *Attorney, Agent, or Firm* — Mueting, Raasch & Gebhardt, P.A.

(57) ABSTRACT

Devices having air bearing surfaces (ABS), the devices including a near field transducer (NFT) that includes a disc configured to convert photons incident thereon into plasmons; and a peg configured to couple plasmons coupled from the disc into an adjacent magnetic storage medium, wherein at least one of a portion of the peg, a portion of the disc, or a portion of both the peg and the disc include a multilayer structure including at least two layers including at least one layer of a first material and at least one layer of a second material, wherein the first material and the second material are not the same and wherein the first and the second materials independently include aluminum (Al), antimony (Sb), bismuth (Bi), boron (B), barium (Ba), calcium (Ca), cerium (Ce), chromium (Cr), cobalt (Co), copper (Cu), erbium (Er), gadolinium (Gd), gallium (Ga), germanium (Ge), gold (Au), hafnium (Hf), indium (In), iridium (Ir), iron (Fe), lanthanum (La), magnesium (Mg), manganese (Mn), molybdenum (Mo), nickel (Ni), niobium (Nb), osmium (Os), palladium (Pd), platinum (Pt), rhenium (Re),
(Continued)

rhodium (Rh), ruthenium (Ru), scandium (Sc), silicon (Si), silver (Ag), strontium (Sr), tantalum (Ta), thorium (Th), tin (Sn), titanium (Ti), vanadium (V), tungsten (W), ytterbium (Yb), yttrium (Y), zirconium (Zr), or combinations thereof.

20 Claims, 8 Drawing Sheets (51) Int. Cl.
   *G11B 5/60* (2006.01)
   *G11B 5/00* (2006.01)
(58) Field of Classification Search
   USPC ...... 360/59, 313, 125.31, 125.74; 369/13.33, 369/13.34, 13.13
   See application file for complete search history.

(56) References Cited

U.S. PATENT DOCUMENTS

| | | | |
|---|---|---|---|
| 5,849,093 A | 12/1998 | Andra | |
| 5,945,681 A | 8/1999 | Tokiguchi | |
| 6,130,436 A | 10/2000 | Renau | |
| 6,589,676 B1 | 7/2003 | Gui | |
| 6,632,483 B1 | 10/2003 | Callegari | |
| 6,641,932 B1 | 11/2003 | Xu | |
| 6,683,426 B1 | 1/2004 | Kleeven | |
| 6,839,191 B2 | 1/2005 | Sugiura | |
| 7,377,228 B2 | 5/2008 | Mack | |
| 7,476,855 B2 | 1/2009 | Huang | |
| 8,077,559 B1 | 12/2011 | Miyauchi | |
| 8,325,567 B2 | 12/2012 | Miyauchi | |
| 8,351,151 B2 | 1/2013 | Katine | |
| 8,351,307 B1 | 1/2013 | Wolf | |
| 8,958,271 B1 | 2/2015 | Peng | |
| 9,378,757 B2 * | 6/2016 | Zhao | G11B 5/314 |
| 2005/0012052 A1 | 1/2005 | Platzgummer | |
| 2006/0238133 A1 | 10/2006 | Horsky | |
| 2008/0230724 A1 | 9/2008 | Low | |
| 2010/0061199 A1 | 3/2010 | Hirara | |
| 2010/0123965 A1 | 5/2010 | Lee | |
| 2010/0123967 A1 | 5/2010 | Batra | |
| 2010/0190036 A1 | 7/2010 | Komvopoulos | |
| 2010/0214685 A1 | 8/2010 | Seigler | |
| 2010/0320403 A1 | 12/2010 | Amaldi | |
| 2011/0002199 A1 | 1/2011 | Takayama | |
| 2011/0006214 A1 | 1/2011 | Bonig | |
| 2011/0026161 A1 | 2/2011 | Ikeda | |
| 2011/0205863 A1 | 8/2011 | Zhao | |
| 2011/0209165 A1 | 8/2011 | Tsai | |
| 2011/0294398 A1 | 12/2011 | Hu | |
| 2011/0317528 A1 | 12/2011 | Miyauchi | |
| 2012/0045662 A1 | 2/2012 | Zou | |
| 2013/0107679 A1 | 5/2013 | Huang | |
| 2013/0148485 A1 | 6/2013 | Jin | |
| 2013/0161505 A1 | 6/2013 | Pitcher | |
| 2013/0164453 A1 | 6/2013 | Pitcher | |
| 2013/0164454 A1 | 6/2013 | Pitcher | |
| 2013/0170332 A1 | 7/2013 | Gao | |
| 2013/0279315 A1 | 10/2013 | Zhao | |
| 2013/0330573 A1 | 12/2013 | Zhao | |
| 2014/0050058 A1 | 2/2014 | Zou | |
| 2014/0113160 A1 | 4/2014 | Pitcher | |
| 2014/0204723 A1 | 7/2014 | Shimazawa | |
| 2014/0254335 A1 | 9/2014 | Gage | |
| 2014/0269237 A1 | 9/2014 | Sasaki | |
| 2014/0307534 A1 | 10/2014 | Zhou | |
| 2014/0376342 A1 | 12/2014 | Wessel | |
| 2014/0376345 A1 | 12/2014 | Seets | |
| 2014/0376349 A1 | 12/2014 | Cheng | |
| 2015/0043319 A1 | 2/2015 | Kasuya | |
| 2015/0131417 A1 | 5/2015 | Zhao | |
| 2015/0170675 A1 | 6/2015 | Shimazawa | |
| 2015/0179194 A1 | 6/2015 | Cheng | |
| 2015/0206545 A1 | 7/2015 | Balamane | |
| 2016/0133291 A1 | 5/2016 | Chen | |
| 2016/0351221 A1 | 12/2016 | Blaber | |

FOREIGN PATENT DOCUMENTS

| | | |
|---|---|---|
| EP | 1328027 | 7/2003 |
| EP | 2106678 | 10/2008 |
| WO | WO 97/45834 | 12/1997 |

OTHER PUBLICATIONS

Angel et al., "Enhanced Low Energy Drift-Mode Beam Currents in a High Current Ion Implanter," IEEE, 1999, pp. 219-222.

Druz et al., "Diamond-Like Carbon Films Deposited Using a Broad, Uniform Ion Beam from an RF Inductively Coupled CH4—Plasma Source", Diamond and Related Materials, vol. 7, No. 7, Jul. 1998, pp. 965-972.

Liu et al., "Influence of the Incident Angle of Energetic Carbon Ions on the Properties of Tetrahedral Amorphous Carbon (ta-C) films", *Journal of Vacuum Science and Technology*, vol. 21, No. 5, Jul. 25, 2003, pp. 1665-1670.

Piazza et al., "Large Area Deposition of Hydrogenated Amorphous Carbon Films for Optical Storage Disks", Diamond and Related Materials, vol. 13, No. 4-8, Apr. 2004, pp. 1505-1510.

Robertson, J., "Diamond-Like Amorphous Carbon," Materials Science and Engineering R 37, 2002, pp. 129-281.

PCT/US2013/030659 Search Report and Written Opinion dated Jun. 17, 2013.

PCT/US2013/024273 Search Report and Written Opinion dated Apr. 2, 2013.

PCT/US2013/024274 Search Report and Written Opinion dated Apr. 2, 2013.

PCT International Search Report and Written Opinion for PCT/US2016/034709 dated Aug. 24, 2016 (12 pages).

PCT International Search Report and Written Opinion for PCT/US2016/034615 dated Aug. 24, 2016 (13 pages).

* cited by examiner

MULTIPIECE NEAR FIELD TRANSDUCERS (NFTS)

PRIORITY

This application claims priority to U.S. Provisional Application No. 62/167,316 entitled, NEAR FIELD TRANSDUCERS (NFTS) AND ASSOCIATED STRUCTURES, filed on May 28, 2015 the disclosure of which is incorporated herein by reference thereto.

SUMMARY

Disclosed are devices having air bearing surfaces (ABS), the devices including a near field transducer (NFT) that includes a disc configured to convert photons incident thereon into plasmons; and a peg configured to couple plasmons coupled from the disc into an adjacent magnetic storage medium, wherein at least one of a portion of the peg, a portion of the disc, or a portion of both the peg and the disc include a multilayer structure including at least two layers including at least one layer of a first material and at least one layer of a second material, wherein the first material and the second material are not the same and wherein the first and the second materials independently include aluminum (Al), antimony (Sb), bismuth (Bi), boron (B), barium (Ba), calcium (Ca), cerium (Ce), chromium (Cr), cobalt (Co), copper (Cu), erbium (Er), gadolinium (Gd), gallium (Ga), germanium (Ge), gold (Au), hafnium (Hf), indium (In), iridium (Ir), iron (Fe), lanthanum (La), magnesium (Mg), manganese (Mn), molybdenum (Mo), nickel (Ni), niobium (Nb), osmium (Os), palladium (Pd), platinum (Pt), rhenium (Re), rhodium (Rh), ruthenium (Ru), scandium (Sc), silicon (Si), silver (Ag), strontium (Sr), tantalum (Ta), thorium (Th), tin (Sn), titanium (Ti), vanadium (V), tungsten (W), ytterbium (Yb), yttrium (Y), zirconium (Zr), or combinations thereof.

Also disclosed are devices having air bearing surfaces (ABS), the devices including a near field transducer (NFT) that includes a disc configured to convert photons incident thereon into plasmons; and a peg configured to couple plasmons coupled from the disc into an adjacent magnetic storage medium, wherein at least a portion of the peg includes a multilayer structure including at least two layers including at least a first layer of a first material and at least a second layer of a second material, wherein the first layer is positioned on top of the peg closest to the disc and the second layer is positioned on the bottom of the peg farthest from the disc, and wherein the first material and the second material are not the same and wherein the first and the second materials independently include aluminum (Al), antimony (Sb), bismuth (Bi), boron (B), barium (Ba), calcium (Ca), cerium (Ce), chromium (Cr), cobalt (Co), copper (Cu), erbium (Er), gadolinium (Gd), gallium (Ga), germanium (Ge), gold (Au), hafnium (Hf), indium (In), iridium (Ir), iron (Fe), lanthanum (La), magnesium (Mg), manganese (Mn), molybdenum (Mo), nickel (Ni), niobium (Nb), osmium (Os), palladium (Pd), platinum (Pt), rhenium (Re), rhodium (Rh), ruthenium (Ru), scandium (Sc), silicon (Si), silver (Ag), strontium (Sr), tantalum (Ta), thorium (Th), tin (Sn), titanium (Ti), vanadium (V), tungsten (W), ytterbium (Yb), yttrium (Y), zirconium (Zr), or combinations thereof.

Further disclosed are devices having air bearing surfaces (ABS), the devices including a near field transducer (NFT) that includes a disc configured to convert photons incident thereon into plasmons and the disc including a core and a shell, wherein the core is peripherally surrounded by the shell, the core has a thickness around the periphery of the core and the core and the shell include different materials; and a peg configured to couple plasmons coupled from the disc into an adjacent magnetic storage medium.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

FIG. 11D shows a perspective view.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure generally relates to data storage devices that utilize heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic media during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the paramagnetic effect.

A laser or other energy source may be directly (e.g., surface-attached) or indirectly (e.g., via optical fiber) coupled to a HAMR read/write head. An optical path (e.g., waveguide) is integrated into the read/write head and delivers the light to a media-facing surface of the read/write head. Because the size of the desired hotspot (e.g., 50 nm or less) is smaller than half a wavelength of the laser light (e.g., 800-1550 nm), conventional optical focusers (e.g., lenses) are diffraction limited and cannot be used to focus the light to create the hotspot. Instead, a near-field transducer (NFT) is employed to direct energy out of the read/write head. The NFT may also be referred to as a plasmonic transducer, plasmonic antenna, near-field antenna, nano-disc, nano-patch, nano-rod, etc.

Generally, the NFT is formed by depositing a thin-film of material such as gold, silver, copper, etc., near an integrated optics waveguide or some other delivery system. When exposed to laser light that is delivered via the waveguide, the light generates a surface plasmon field on the NFT. The NFT is shaped such that the surface plasmons are directed out of a surface of the write head onto a magnetic recording medium.

Due to the intensity of the laser light and the small size of the NFT, the NFT and surrounding material are subject to a significant rise in temperature during writing. Over time, this can affect the integrity and/or reliability of the NFT, for example, causing it to become misshapen or recess. Other events, such as contact between the read/write head and recording medium, contamination, etc., may also degrade the operation of the NFT and nearby optical components. Degradation of the NFT will affect the effective service life of a HAMR read/write head. In view of this, methods and apparatuses described herein are used to increase the thermal robustness of the NFT, such as at a peg that extends towards the recording media.

Figure 1:
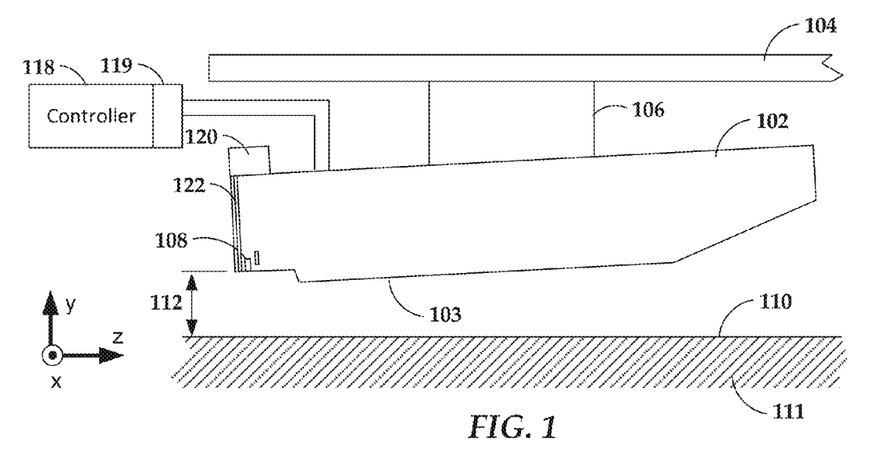
FIG. 1 is a block diagram of a hard drive slider and media arrangement according to an illustrative embodiment.

In reference now to FIG. 1, a block diagram shows a side view of a read/write head 102 according to an example embodiment. The read/write head 102 may be used in a magnetic data storage device, e.g., HAMR hard disc drive. The read/write head 102 may also be referred to as a slider, write head, read head, recording head, etc. The read/write head 102 is coupled to an arm 104 by way of a suspension 106, e.g., a gimbal. The read/write head 102 includes read/write transducers 108 at a trailing edge that are held proximate to a surface 110 of a magnetic recording medium 111, e.g., a magnetic disc. When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an air bearing surface (ABS) 103 (also referred to herein as a "media-facing surface") of the read/write head 102 when the recording medium 111 is rotating.

A controller 118 is coupled to the read/write transducers 108, as well as other components of the read/write head 102, such as heaters, sensors, etc. The controller 118 may be part of general- or special-purpose logic circuitry that controls the functions of a storage device that includes at least the read/write head 102 and recording medium 111. The controller 118 may include or be coupled to interface circuitry 119 such as preamplifiers, buffers, filters, digital-to-analog converters, analog-to-digital converters, decoders, encoders, etc., that facilitate electrically coupling the logic of the controller 118 to the signals used by the read/write head 102 and other components.

The illustrated read/write head 102 is configured as a HAMR device, and so includes additional components that form a hot spot on the recording medium 111 near the read/write transducer 108. These components include laser 120 (or other energy source) and waveguide 122. The waveguide 122 delivers light from the laser 120 to components near the read/write transducers 108. These components are shown in greater detail in FIG. 2, which is a block diagram illustrating a cross-sectional view of the read/write head 102 according to an example embodiment.

Figure 2:
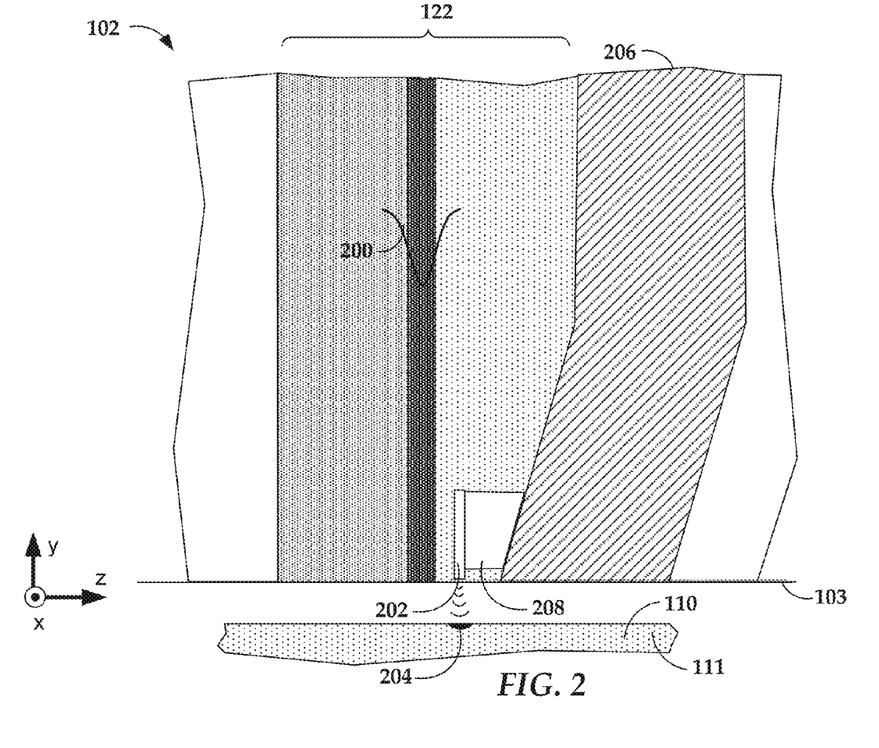
FIG. 2 is a cross-sectional view of a read/write head according to an illustrative embodiment.

As shown in FIG. 2, the waveguide 122 receives electromagnetic energy 200 from the energy source, the energy being coupled to a near-field transducer (NFT) 202. The NFT 202 is made of a metal (e.g., gold, silver, copper, etc.) that achieves surface plasmonic resonance in response to the applied energy 200. The NFT 202 shapes and transmits the energy to create a small hotspot 204 on the surface 110 of medium 111. A magnetic write pole 206 causes changes in magnetic flux near the media-facing surface 103 in response to an applied current. Flux from the write pole 206 changes a magnetic orientation of the hotspot 204 as it moves past the write pole 206 in the downtrack direction (z-direction).

The energy 200 applied to the near-field transducer 202 to create the hotspot 204 can cause a significant temperature rise in a local region near the media-facing surface 103. The near-field transducer 202 may include a heat sink 208 that draws away some heat, e.g., to the write pole 206 or other nearby heat-conductive component. Nonetheless, the temperature increase near the near-field transducer 202 can be significant, leading to degradation of the near-field transducer 202 and other components over time. As such, techniques described herein facilitate increasing thermal robustness of the near-field transducer.

Figure 3:
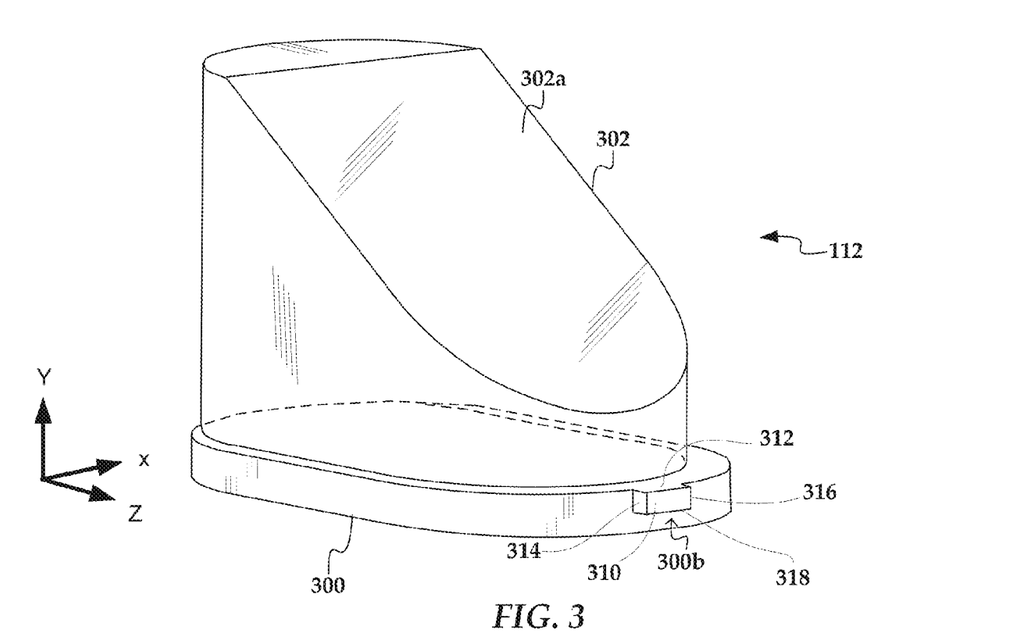
FIG. 3 is a perspective view of a near field transducer according to an illustrative embodiment.

In FIG. 3, a perspective views show details of a device 112 including a NFT. The device 112 can include two parts: a disc 300 and a heat sink 302 proximate to (e.g., deposited directly on to) the disc 300. In this example, the outline of the disc 300 on the xz-plane (which is a substrate-parallel plane) is enlarged relative to the heat sink 302, although they may be the same size. The heat sink 302 can include an angled surface 302a that is located proximate to a write pole (see, e.g., write pole 206 in FIG. 2).

The disc 300 acts as a collector of optical energy from a waveguide and/or focusing element. The disc 300 achieves surface plasmon resonance in response to the optical energy and the surface plasmons are directed to the medium via a peg 300b that extends from the disc 300. It should be noted that the heat sink may also contribute to the energy transfer process and in some such embodiments a NFT does not necessarily include a separate disc and heat sink but a single component that can act as both. In this example, the disc 300 is configured as an elongated plate with rounded (e.g., circular) ends, also referred to as a stadium or capsule shape. Other enlarged portion geometries may be used, including circular, rectangular, triangular, etc.

Figure 4:
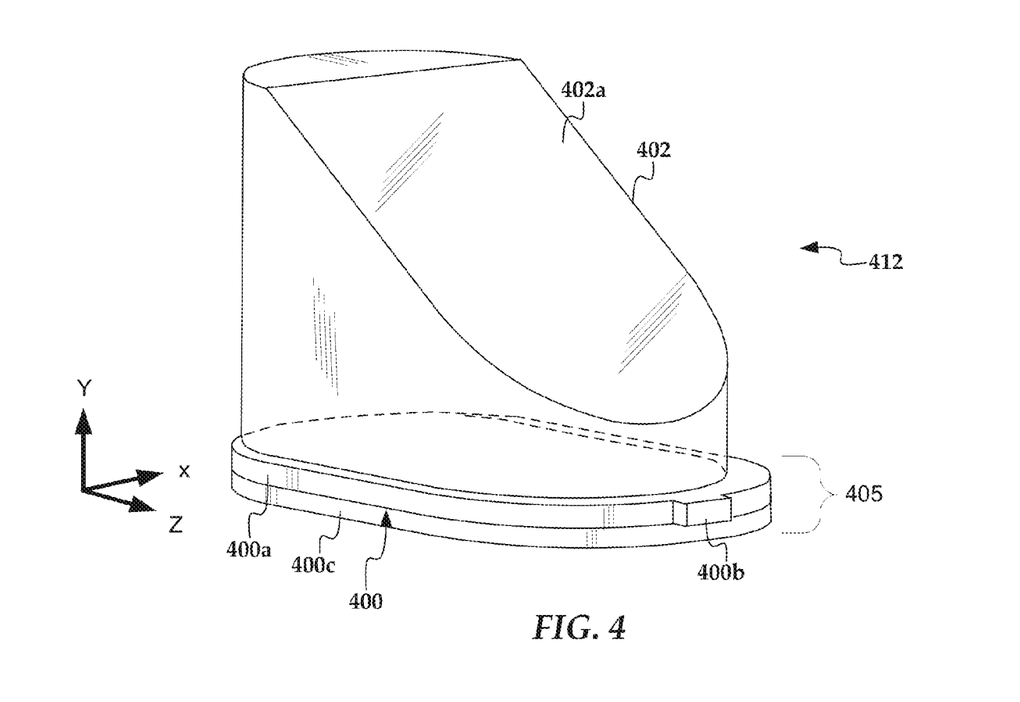
FIG. 4 is a perspective view of a near field transducer according to an illustrative embodiment.

In FIG. 4, a perspective views show details of a device 412 according to an example embodiment. The device 412 includes a NFT 405 and a heat sink 402 proximate to (e.g., deposited directly on to) the disc 400 of the NFT 405. In this example, the outline of the disc 400 on the xz-plane (which is a substrate-parallel plane) is enlarged relative to the heat sink 402, although they may be the same size. The heat sink 402 includes an angled surface 402a that is located proximate to a write pole (see, e.g., write pole 206 in FIG. 2).

The disc 400 includes a top disc 400a that acts as a collector of optical energy from a waveguide and/or focusing element. The top disc 400a achieves surface plasmon resonance in response to the optical energy and the surface plasmons are directed to the medium via a peg 400b that extends from top portion 400a. In this example, the top portion 400a is configured as an elongated plate with rounded (e.g., circular) ends, also referred to as a stadium or capsule shape. Other enlarged portion geometries may be used, including circular, rectangular, triangular, etc.

The disc 400 also includes a bottom disc 400c. The bottom disc 400c can also be referred to as a sunken disc. The term "sunken disc" refers to a base or bottom portion that extends below the peg, as shown by the base portion 400c in FIG. 3. This can also be described as the peg extending beyond the bottom disc 400c. In some embodiments, such as that depicted in FIG. 4, the bottom disc 400c and the top disc 400a can have the same outline shape (e.g., stadium shape) as well as a same outline size. In some embodiments, the bottom disc 400c and the top disc 400a can have different outline shapes, different outline sizes, or combinations thereof. The peg 400b extends beyond the bottom disc 400c. The bottom portion 400c is disposed proximate a light delivery structure (e.g., a waveguide core) and away from a write pole. In some embodiments, the bottom disc 400c may likely be, but need not be, the primary collector of optical energy.

Disclosed NFTs may offer advantages to overcome recession of the peg of the NFT during operation. Because there can be insufficient adhesion of the peg material to the surrounding dielectrics, the peg material may be under dense, or combinations thereof, the peg can, under operating conditions migrate away from the ABS. Some embodiments of disclosed NFTs utilize multilayered pegs, rods or discs to increase the adhesion area, thermal stability, or combinations thereof and thereby may improve the robustness of the peg. Some embodiments of disclosed NFTs decrease the amount of the peg material which is mostly likely to recess by utilizing a disc that includes a core of a different material than the shell. A decreased amount of more likely recessing or migrating material may lead to less recession.

Disclosed NFTs include one or more portions thereof that are made up of two or more layers. For example, a NFT can include a portion of a peg that is made up of two or more layers, a peg that is made up of two or more layers a portion of a disc that is made up of two or more layers, a disc that is made up of two or more layers, or any combination thereof including for example both a disc and a peg. The two or more layers in such embodiments include a first layer of a first material and a second layer of a second material. Optionally, more than two layers can be included, for example alternating layers of a first material and a second material.

In some embodiments, the thicknesses of the individual layers may be the same or different. In some embodiments, the thickness of an individual layer may independently be not less than 3 Å, not less than 5 nm, or not less than 10 nm. In some embodiments, the thickness of an individual layer may independently be not greater than 40 nm, not greater than 25 nm, or not greater than 15 nm.

Disclosed multilayer structures may be advantageous because they can include a first material that has relatively good plasmonic properties and a second material that has relatively good thermal properties, provides adhesive properties, or both. Alternatively, different properties could be provided by one or both of the first and second materials.

In some embodiments, the first and second materials of a multilayer (e.g., at least two) structure can be independently selected from the following materials. In some embodiments, first and second materials of a multilayer can include aluminum (Al), antimony (Sb), bismuth (Bi), boron (B), barium (Ba), calcium (Ca), cerium (Ce), chromium (Cr), cobalt (Co), copper (Cu), erbium (Er), gadolinium (Gd), gallium (Ga), germanium (Ge), gold (Au), hafnium (Hf), indium (In), iridium (Ir), iron (Fe), lanthanum (La), magnesium (Mg), manganese (Mn), molybdenum (Mo), nickel (Ni), niobium (Nb), osmium (Os), palladium (Pd), platinum (Pt), rhenium (Re), rhodium (Rh), ruthenium (Ru), scandium (Sc), silicon (Si), silver (Ag), strontium (Sr), tantalum (Ta), thorium (Th), tin (Sn), titanium (Ti), vanadium (V), tungsten (W), ytterbium (Yb), yttrium (Y), zirconium (Zr), or combinations thereof. Illustrative examples of materials for the first and second materials of a multilayer can include binary and/or ternary alloys including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative examples of materials for the first and second materials of a multilayer can include lanthanides, actinides, or combinations thereof including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative examples of materials for the first and second materials of a multilayer can include dispersions including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative examples of materials for the first and second materials of a multilayer can include alloys or intermetallics based on or including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative alloys or intermetallics can include, for example binary and ternary silicides, nitrides, and carbides. For example vanadium silicide (VSi), niobium silicide (NbSi), tantalum silicide (TaSi), titanium silicide (TiSi), palladium silicide (PdSi) for example zirconium nitride (ZrN), aluminum nitride (AlN), tantalum nitride (TaN), hafnium nitride (HfN), titanium nitride (TiN), boron nitride (BN), niobium nitride (NbN), or combinations thereof. Illustrative carbides can include, for example silicon carbide (SiC), aluminum carbide (AlC), boron carbide (BC), zirconium carbide (ZrC), tungsten carbide (WC), titanium carbide (TiC) niobium carbide (NbC), or combinations thereof. Additionally doped oxides can also be utilized. Illustrative doped oxides can include aluminum oxide (AlO), silicon oxide (SiO), titanium oxide (TiO), tantalum oxide (TaO), yttrium oxide (YO), niobium oxide (NbO), cerium oxide (CeO), copper oxide (CuO), tin oxide (SnO), zirconium oxide (ZrO) or combinations thereof. Illustrative examples of materials for the first and second materials of a multilayer can include conducting oxides, conducting nitrides or combinations thereof of various stoichiometries where one part of the oxide, nitride or carbide includes Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative examples of materials for the first and second materials of a multilayer can include a metal including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr doped with oxide, carbide or nitride nanoparticles. Illustrative oxide nanoparticles can include, for example, oxides of yttrium (Y), lanthanum (La), barium (Ba), strontium (Sr), erbium (Er), zirconium (Zr), hafnium (Hf), germanium (Ge), silicon (Si), calcium (Ca), aluminum (Al), magnesium (Mg), titanium (Ti), cerium (Ce), tantalum (Ta), tungsten (W), thorium (Th), or combinations thereof. Illustrative nitride nanoparticles can include, for example, nitrides of zirconium (Zr), titanium (Ti), tantalum (Ta), aluminum (Al), boron (B), niobium (Nb), silicon (Si), indium (In), iron (Fe), copper (Cu), tungsten (W), or combinations thereof. Illustrative carbide nanoparticles can include, for example carbides of silicon (Si), aluminum (Al), boron (B), zirconium (Zr), tungsten (W), titanium (Ti), niobium (Nb), or combinations thereof. In some embodiments nanoparticles can include combinations of oxides, nitrides, or carbides. It is to be understood that lists of combinations of elements are not exclusive to monoatomic binary combinations, for example VSi is taken to include V2Si and VSi2, for example.

Disclosed herein are various specific illustrative embodiments of NFTs that include a multilayer portion. It should be understood that potential material choices for the multilayers in such particular embodiments are not intended to limit the scope of the instant disclosure and in some instances may expand upon the materials provided above. Such expansions should be considered to be applicable to possible material choices for any configurations of multilayer NFT portions disclosed herein.

Figure 5A:
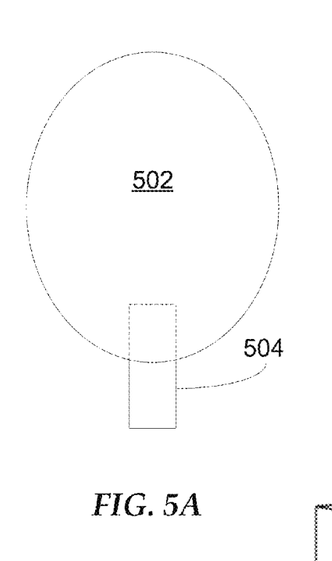
FIGS. 5A to 5D illustrate a near field transducer that includes a multilayer peg that extends into the disc, with FIG. 5A showing a top down diagram, FIG. 5B showing a cross section perpendicular to the ABS, FIG. 5C showing a view from the ABS, and FIG. 5D showing a perspective view that includes additional components illustrated.
Figure 5B:
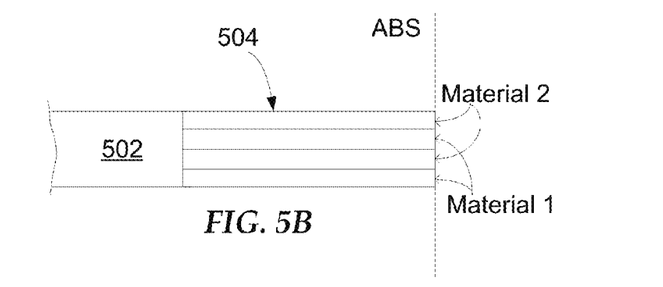
Figure 5C:
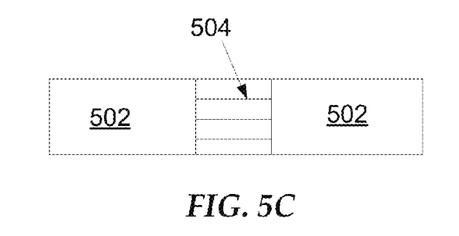
Figure 5D:
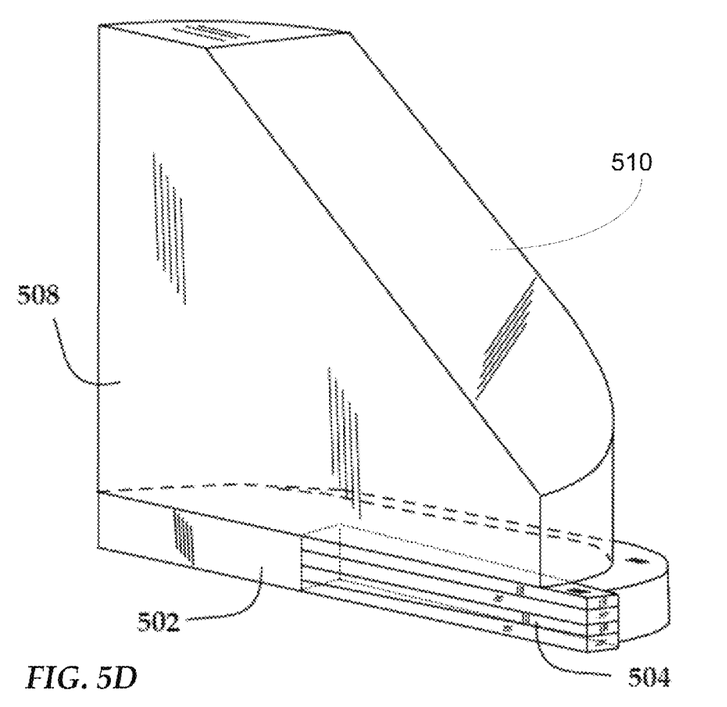

FIGS. 5A to 5D illustrate disclosed embodiments that include a peg that includes at least two different materials, e.g., two different layers or a multilayer in the peg. As seen in FIG. 5A, the NFT includes a disc 502 and a peg 504. As seen in FIG. 5A, the peg in this illustrated embodiment extends into the footprint or under the disc, as indicated by the dashed lines in FIG. 5A. FIG. 5B shows a cross section taken perpendicular to the ABS showing the peg 504 and a portion of the disc 502. FIG. 5C shows a view from the ABS showing the peg 504 flanked by both sides of the disc 502. FIG. 5D shows a perspective view, including the write pole 510 and the heat sink 508. Although not visible in the perspective view, the peg 504 extends into the footprint of the disc 502 and the cut away portion of the disc 502 would surround the peg 504 coming out of the paper and would also be present behind the paper.

Figure 6A:
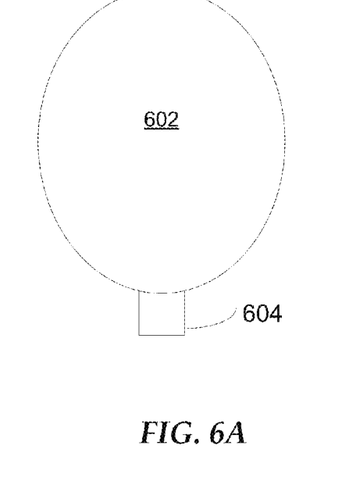
FIGS. 6A to 6C illustrate a near field transducer that includes a multilayer peg that does not extend into the disc, with FIG. 6A showing a top down diagram, FIG. 6B showing a cross section perpendicular to the ABS and FIG. 6C showing a view from the ABS.
Figure 6B:
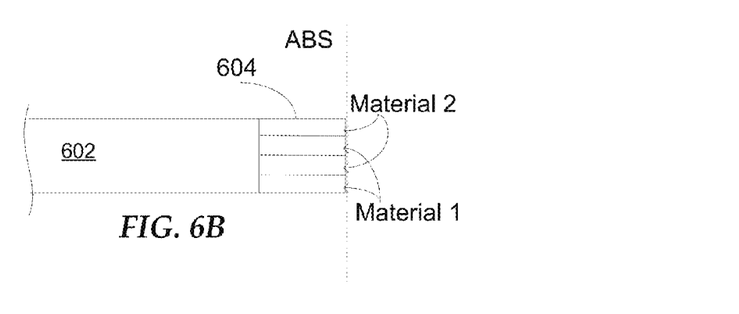
Figure 6C:
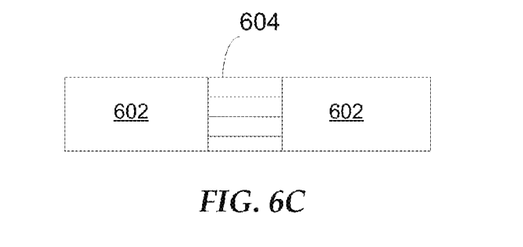

FIG. 6A to 6C illustrate another embodiment of a peg that includes at least two different materials. As seen in FIG. 6C, the NFT includes a disc 602 and a peg 604. As seen in FIG. 6A, the peg in this illustrate embodiment, contrary to that of FIGS. 5A to 5D does not extend into the footprint of the disc 602. FIG. 6B shows a cross section taken perpendicular to the ABS showing the peg 604 and a portion of the disc 602. FIG. 6C shows a view from the ABS showing the peg 604 flanked by both sides of the disc 602.

FIGS. 5B and 6B illustrate a multilayer nature of the peg as a four layer structure including alternating layers of material 1, or a first material and material 2, or a second material. In some embodiments, material 1, which can be located on the bottom of the peg (e.g., the surface of the peg opposite the heat sink and write pole, see FIG. 5D) can be a dielectric material having a relatively low optical loss (which in some embodiments includes dielectric materials that can have an imaginary refractive index, k, of not greater than 0.2) or a metal. Illustrative dielectric materials with relatively low optical loss that may be useful as a first material can include, for example silicon (Si), silicon carbide (SiC), partially hydrogenated Si and/or SiC; and oxides, nitrides, carbides and fluorides of aluminum (Al), boron (B), barium (Ba), calcium (Ca), cerium (Ce), copper (Cu), erbium (Er), iron (Fe), germanium (Ge), hafnium (Hf), indium (In), lanthanum (La), magnesium (Mg), niobium (Nb), silicon (Si), strontium (Sr), tantalum (Ta), thorium (Th), titanium (Ti), tungsten (W), yttrium (Y), zirconium (Zr), and combinations thereof (eg SrTiO or MgF or TaO), for example. Additional illustrative specific examples of material 1 can include alloys having the form AuX, AgX, CuX, AlX, RhX, IrX, PdX, PtX, where X is selected from Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, W, Yb, or Y. Additional illustrative specific examples of material 1 can include one or more alloys, admixtures, or combinations thereof of Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, W, Yb, Y, or combinations thereof with group I elements such as Li, Na, and K.

In some embodiments, material 2, which can be located on the top of the peg in some embodiments (e.g., the surface of the peg closest to the heat sink and write pole, see FIG. 5D) can be chosen so as to provide diffusion barrier properties, adhesion properties, or combinations thereof. As such, in some embodiments, illustrative material 2 materials can constitute the subset of material 1 options that act as diffusion inhibitors, adhesion layers, or a combination thereof for material 1. For example, in a specific illustrative embodiment where material 1 may be gold, material 2 may advantageously be Rh or Ir. In some alternative embodiments, material 2 may constitute the subset of material 1 that has relatively good plasmonic properties (eg Ag, Cu, Au, Pd, etc). For example, in a specific illustrative embodiment where material 1 may be Rh or Ir, then material 2 may be Au or Ag.

In some illustrative embodiments material 1 may be Au and material 2 may be Au with YO or ZrO inclusions. In some other illustrative embodiments material 1 may be Cu and material 2 may be a Rh doped Au alloy. In some illustrative embodiments material 1 may be TaO or MgF and material 2 may be Au. In some illustrative embodiments material 1 may be Au and material 2 may be TaO or MgF.

In some embodiments, the shape or configuration of the discs 502, 602 may, at least in part, dictate advantageous material properties, as the shape at least in part defines the plasmonic mode profile. For some mode profiles, a high refractive index may be advantageous and as such hydrogenated SiC may be an advantageous dielectric. In other embodiments, the shape of the discs 502, 602 may be such that a low index material would be advantageous, for example MgF may be useful. In cases where resistance to corrosion is being considered, a low index material which is at least somewhat resistant to corrosion, such as SiO may be advantageous.

It should be noted that although the embodiments of FIGS. 5A to 5D and 6A to 6C show four layers in the multilayered pegs, pegs in such configurations can include any number of layers of two or more materials. The possible various configurations will be discussed further with respect to FIGS. 9A to 9E.

Figure 7A:
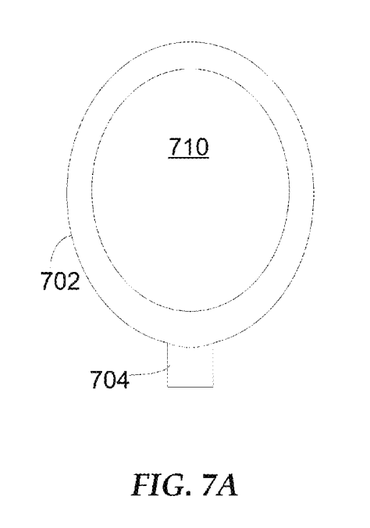
FIGS. 7A to 7C illustrate a near field transducer that includes a multilayer disc and peg, with FIG. 7A showing a top down diagram, FIG. 7B showing a cross section perpendicular to the ABS and FIG. 7C showing a view from the ABS.
Figure 7B:
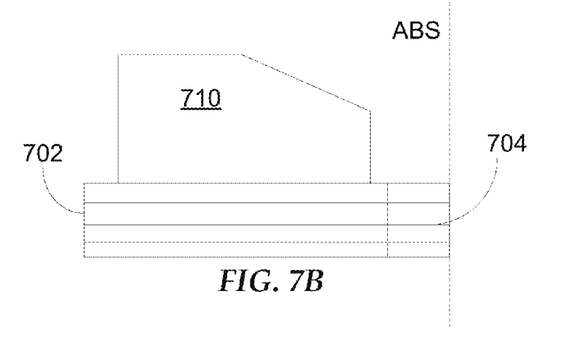
Figure 7C:
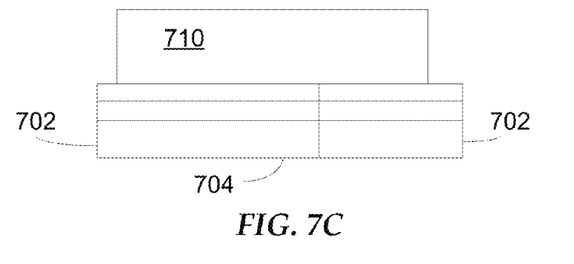
Figure 7D:
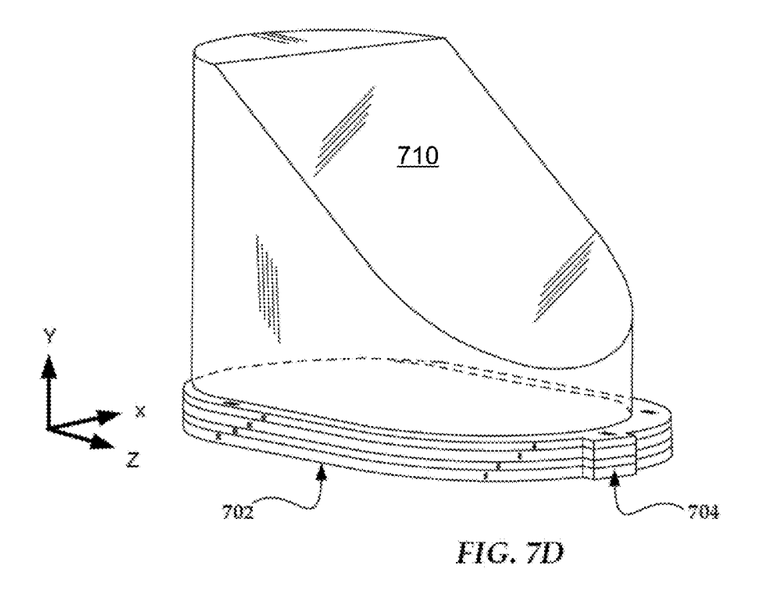
FIG. 7D shows a perspective view that includes additional components illustrated.

FIGS. 7A to 7D illustrate embodiments where both the disc and the peg are multilayered. In some embodiments, the peg and the disc can but need not be contiguous. In some embodiments, the peg and the disc can but need not be made via the same process. FIG. 7A shows the disc 702 and peg 704, which in this embodiment are contiguous. Also depicted in FIG. 7A is the heat sink 710. FIG. 7B shows a cross section taken perpendicular to the ABS that shows the peg 704, the disc 702. FIG. 7C shows a view from the ABS also showing the disc 702, the peg 704 and the heatsink 710. It should be noted that the peg 704 and the disc 702 are shown as delineated (by the dashed lines in FIGS. 7A and 7B) but they can but need not be contiguous without having a defined difference. In some embodiments the demarcation between the peg and the disc can be defined by the trace of the footprint of the disc, as seen by the dashed line in FIG. 7A. FIG. 7D shows a perspective view of the structure including the disc 702, the peg 704 and the heat sink 710. The portion of the monolithic disc 702/peg 704 delineated as the peg can easily be understood by the illustration in FIG. 7D.

Figure 8:
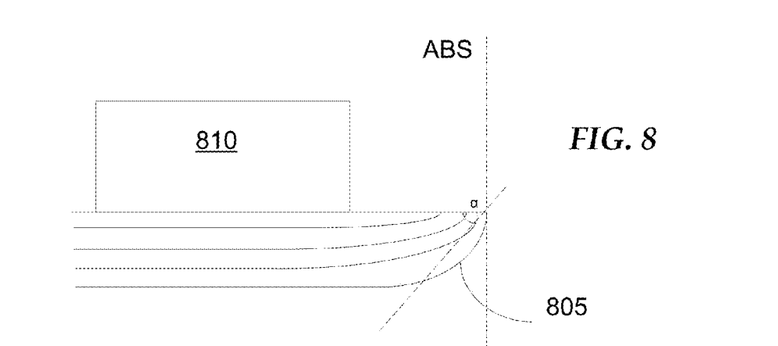
FIG. 8 shows a cross section perpendicular to the ABS of a multilayered disc with a bottom taper.

FIG. 8 shows another embodiment that can be used in combination with any of the embodiments depicted in FIGS. 5A to 5D, 6A to 6C, or 7A to 7D. FIG. 8 shows a cross section taken perpendicular to the ABS. The structure in FIG. 8 includes a beveled front (towards the ABS) portion 805. The bevel can be defined by the effective angle from the plane of the flat portion of the disc opposing the heatsink 810 proximal to the ABS to the corner of the disc 805 that intersects the ABS. In some embodiments the angle ($\alpha$ as seen in FIG. 8) can be from 30 to 75°. Illustrative embodiments that include the performance is improved by minimizing the down track (vertical) footprint of the peg at the ABS. This improves thermal gradient in the media and therefore improves areal density capability.

All of the embodiments depicted in FIGS. 6A to 7D include at least two layers, with each of the layers being made of a different material. In some embodiments, no matter the number of layers, only two different materials are utilized. In some illustrative embodiments, both of the materials can be metals, or more specifically two different metals, which are still referred to herein as material 1 and material 2 for the sake of clarity.

In some embodiments, material 1 can be chosen by considering the melting point of the material. For example material 1 can be selected from the subset of materials listed above (in paragraph 0031) that have melting temperatures above 1800° C., are at least somewhat resistant to oxidation, or any combination thereof. In some embodiments material 1 can be chosen to have relatively good plasmonic properties. In some embodiments, material 1 can include a material selected from rhodium (Rh), iridium (Ir), platinum (Pt), palladium (Pd), molybdenum (Mo), cobalt (Co), tantalum (Ta), gold (Au), silver (Ag), copper (Cu) or combinations thereof. In some embodiments, material 1 can be selected from Rh, Ir, Pd, Pt, or combinations thereof. In some embodiments, material 1 can be selected from Rh or Ir. In some embodiments, material 1 can include, for example Au with YO nanoparticle inclusions or Au with ZrO nanoparticle inclusions.

In some embodiments, material 2 can be selected from Rh, Ir, Pd, Pt, or combinations thereof. In some embodiments, material 2 can be selected from Rh, Ir, or combinations thereof. In some embodiments, material 1 can be selected from the subset of materials listed above (paragraph 0031) that have melting temperature above 1800° C., are at least somewhat resistant to oxidation, or any combination thereof. In some embodiments material 2 can be chosen to have relatively good plasmonic properties. In some embodiments, material 2 can include, for example Au with YO nanoparticle inclusions or Au with ZrO nanoparticle inclusions.

Any of the embodiments depicted in FIGS. 6A to 7D (including the ability to modify any of these embodiments with the concept of FIG. 8) can include at least two layers made of at least two different materials, e.g., material 1 and material 2 as discussed above. However, more layers of different materials can also be included. FIGS. 9A to 9F illustrate different number of different material layers and different configurations (e.g., order) thereof. The surface indicated as 902 in all of the different embodiments is the surface that is closest to or in contact with the heatsink of the structure. A layer designated as Material 1 in FIGS. 9A to 9F can include any of the materials listed above with respect to material 1; and a layer designated as Material 2 in FIGS. 9A to 9F can include any of the materials listed above with respect to material 2.

Figure 9A:
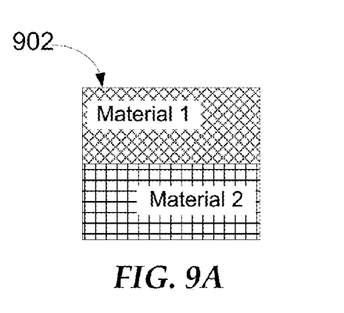
FIGS. 9A to 9F offer illustrative configurations for multilayer pegs, multilayer rods, multilayer discs or combinations thereof.
Figure 9B:
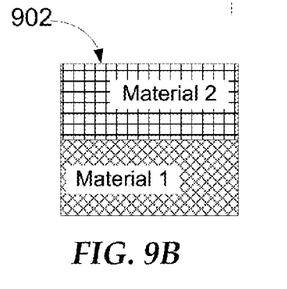
Figure 9C:
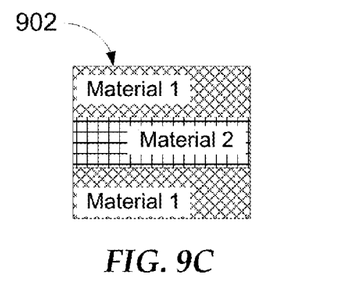
Figure 9D:
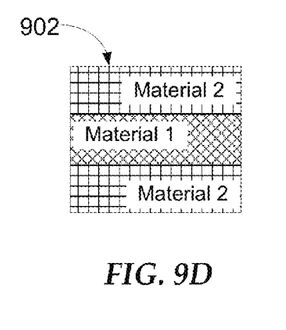
Figure 9E:
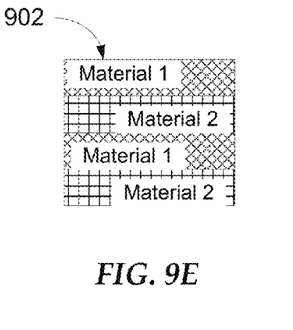
Figure 9F:
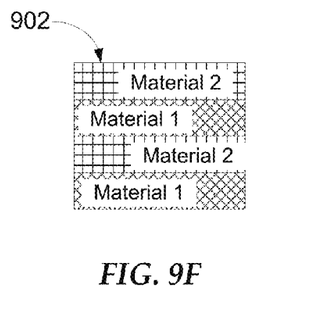

FIG. 9A includes two layers with a Material 1 layer on the top and a Material 2 layer on the bottom. Such an embodiment may be advantageous with regard to reliability when material 1 is a thermally robust material (e.g., Rh, W, Ir, Ru, or combinations thereof) and material 2 exhibits superior plasmonic properties (e.g., Au, Ag, Cu, or combinations thereof). FIG. 9B includes two layers with a Material 2 layer on the top and a Material 1 layer on the bottom. Such an embodiment may be advantageous with regard to performance when material 1 is a thermally robust material (e.g., Rh, W, Ir, Ru, or combinations thereof) and material 2 exhibits superior plasmonic properties (e.g., Au. Ag, Cu, or combinations thereof). FIG. 9C includes three layers with Material 1 layers on both the top and the bottom and a Material 2 layer in between the two Material 1 layers. Such an embodiment may be advantageous with respect to reliability when material 1 is a thermally robust material (e.g., Rh, W, Ir, Ru, or combinations thereof) and material 2 exhibits superior plasmonic properties (e.g., Au. Ag, Cu, or combinations thereof). FIG. 9D includes three layers with Material 2 layers on both the top and the bottom and a Material 1 layer in between the two Material 2 layers. Such an embodiment may be advantageous with respect to performance when material 1 is a thermally robust material (e.g., Rh, W, Ir, Ru, or combinations thereof) and material 2 exhibits superior plasmonic properties (e.g., Au, Ag, Cu, or combinations thereof). FIG. 9E includes four layers with a Material 1 layer on the top and a Material 2 layer on the bottom with a Material 2 layer adjacent the top Material 1 layer and a Material 1 layer adjacent the bottom Material 2 layer. Such an embodiment may be advantageous with respect to reliability when material 1 is a thermally robust material (e.g., Rh, W, Ir, Ru, or combinations thereof) and material 2 exhibits superior plasmonic properties (e.g., Au. Ag, Cu, or combinations thereof). The configuration of FIG. 9E can also be characterized as two alternating Material 1 and Material 2 bi-layers with the Material 1 layer on top and the Material 2 layer on the bottom. FIG. 9F includes four layers with a Material 2 layer on the top and a Material 1 layer on the bottom with a Material 1 layer adjacent the top Material 2 layer and a Material 2 layer adjacent the bottom Material 1 layer. Such an embodiment may be advantageous with respect to performance when material 1 is a thermally robust material (e.g., Rh, W, Ir, Ru, or combinations thereof) and material 2 exhibits superior plasmonic properties (e.g., Au, Ag, Cu, or combinations thereof). The configuration of FIG. 9F can also be characterized as two alternating Material 2 and Material 1 bi-layers with the Material 2 layer on top and the Material 1 layer on the bottom.

Figure 10A:
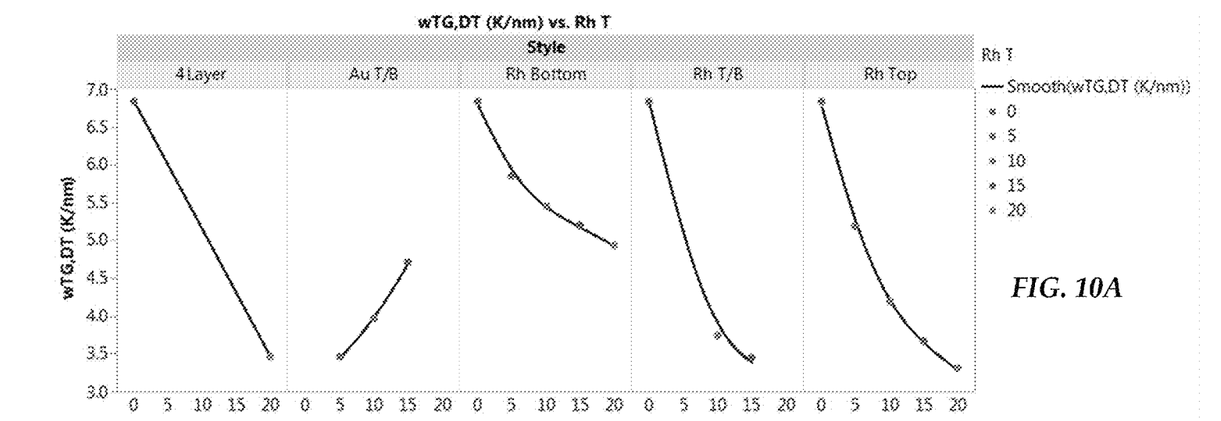
FIG. 10A to 10C show modeling of systems where material 1 is rhodium (Rh) and material 2 is gold (Au), with FIG. 10A showing the thermal gradient (wTG, DT) in degrees Kelvin per nanometers (K/nm), FIG. 10B showing the modeled input power (in milliwatts (mW)) and FIG. 10C showing the laser only peg temperature (in Kelvin (K)).
Figure 10B:
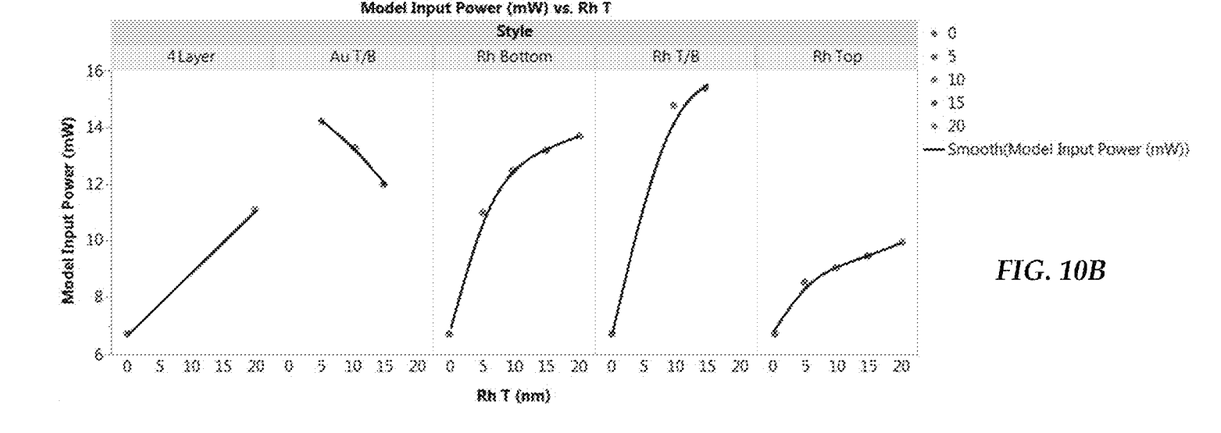
Figure 10C:
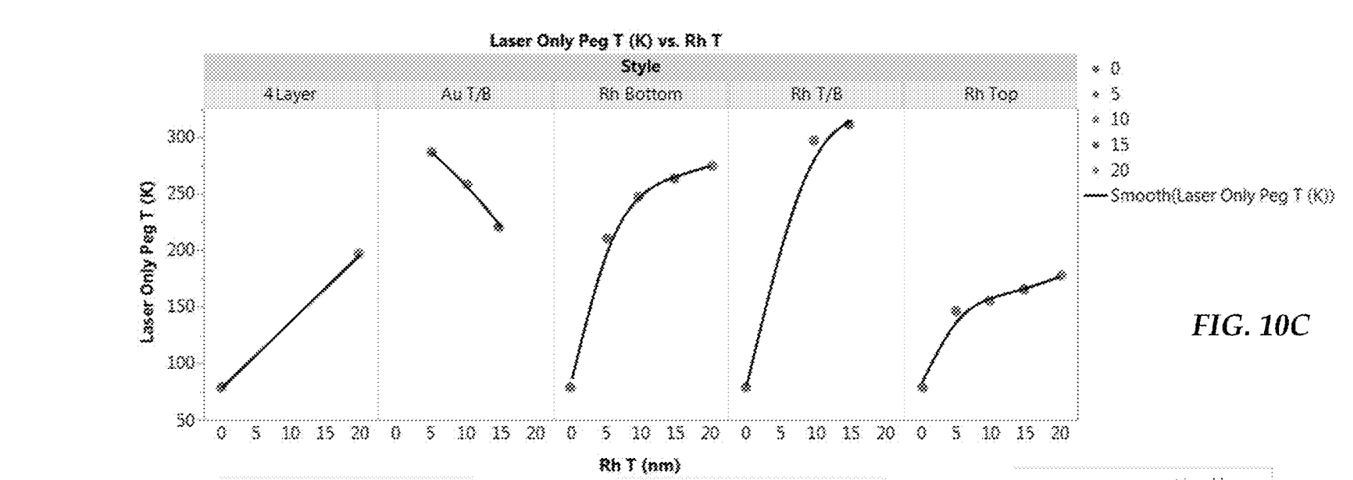

FIG. 10A to 10C show modeling of systems where material 1 is rhodium (Rh) and material 2 is gold (Au). The x axis on all of these graphs show the total thickness (in nanometers) of rhodium (Rh), material 1. The first panel in all of FIGS. 10A to 10C depict the embodiment in FIG. 9E with the thicknesses of the layers from top to bottom equal to 10 nm Rh, 10 nm Au, 10 nm Rh and 20 nm Au; the second panel in all of FIGS. 10A to 10C depict the embodiment in FIG. 9D with the sum of the thickness of all layers being 50 nm; the third panel in all of FIGS. 10A to 10C depict the embodiment in FIG. 9B with the thickness of the Rhodium being equally divided between the top and bottom of the stack and the sum of the thickness of all layers being 50 nm; the fourth panel in all of FIGS. 10A to 10C depict the embodiment in FIG. 9C with the sum of the thickness of all layers being 50 nm; and the fifth panel in all of FIGS. 10A to 10C depict the embodiment in FIG. 9A with the sum of the thickness of all layers being 50 nm.

FIG. 10A shows the thermal gradient (wTG, DT) in degrees Kelvin per nanometers (K/nm) which is an indication of the areal density capability of a magnetic recording head including such a structure. In comparing the modeled results, it should be noted that higher wTG, DT implies a higher areal density capability. FIG. 10B shows the modeled input power (in milliwatts (mW)) which is an indication of the efficiency of a magnetic recording head including such a structure. In comparing the modeled results, it should be noted that lower input power implies a higher efficiency. FIG. 10C shows the laser only peg temperature (in Kelvin (K)). In comparing the modeled results, it should be noted that lower temperatures are generally desired. With regard to the temperature results, it is noted that additional interfaces and reduced heatsinking would expectedly result in increased temperatures. Although lower temperatures are generally preferable, higher temperatures can be tolerated when the materials that comprise the NFT have improved thermal robustness and high melting temperature (e.g. Rh).

Figure 11A:
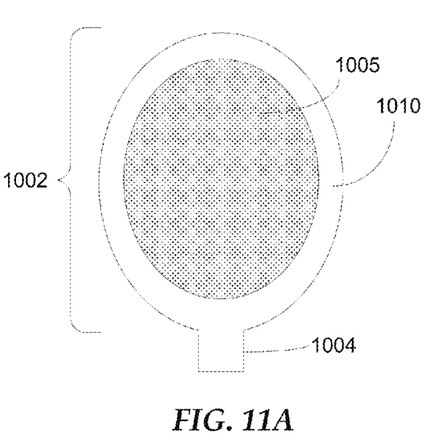
FIGS. 11A to 11D show a disc that includes a core of a different material than a shell as disclosed herein with FIG. 11A showing a top down diagram, FIG. 11B showing a cross section perpendicular to the ABS, FIG. 11C showing a perspective view of the entire disc only.
Figure 11B:
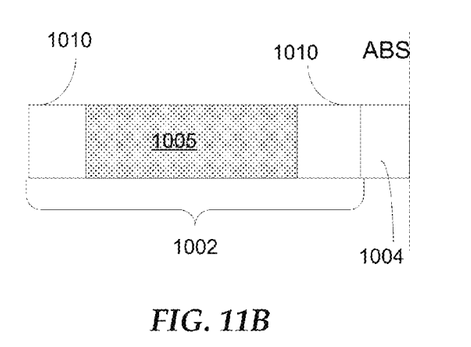

Some embodiments of disclosed NFTs decrease the amount of the material that is mostly likely to recess by utilizing a disc that includes a core of a different material than the shell. Such NFTs can include pegs with the same or different materials than the shell, the core, or both. A decreased amount of more likely recessing or migrating material may lead to less recession. FIGS. 11A to 11D show illustrative NFTs. FIG. 11A shows a diagram of a NFT that includes a disc 1002 that has a core 1005 and a shell 1010. The core 1005 is entirely surrounded on the periphery (as opposed to the bottom and top surfaces) by the shell 1010. The NFT also includes a peg 1004. Although the peg 1004 appears to be contiguous with the shell 1010, that need not be the case. FIG. 11B shows a cross section taken perpendicular the ABS to show the disc 1002 including a shell 1010 and an internal core 1005. The NFT in FIG. 11B also includes a peg 1004. Although not depicted in any of the illustrations of FIGS. 11A to 11D, it should be noted that the disclosed structures can be used in combination with a heat sink as disclosed elsewhere in this document or otherwise.

Figure 11C:
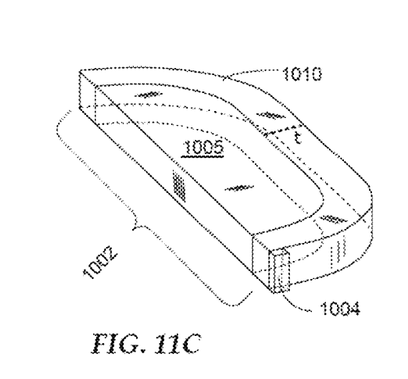
Figure 11D:
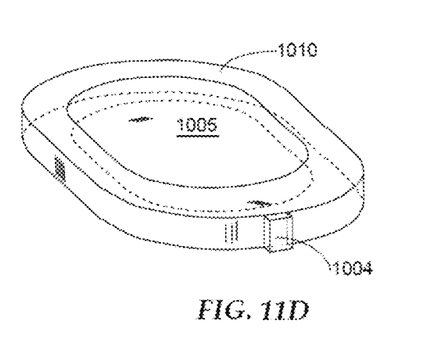

FIG. 11C shows a perspective view of half of a cross section of a NFT cut perpendicular to the ABS through the peg 1004 and FIG. 11D shows a perspective view of the entire NFT. In the views of FIG. 11C and 11D, the disc 1002 includes a core 1005 and a shell 1010 and a peg 1004. The view of FIG. 11C also shows the thickness of the shell 1010, which is designated as t in FIG. 11C. In some embodiments, the thickness of the shell, t can be not less than 20 nm, or not less than 30 nm. In some embodiments, the thickness of the shell, t can be not greater than 60 nm or not greater than 50 nm.

In some embodiments, the material of the shell, the core, or combinations thereof can independently include aluminum (Al), antimony (Sb), bismuth (Bi), chromium (Cr), cobalt (Co), copper (Cu), erbium (Er), gadolinium (Gd), gallium (Ga), gold (Au), hafnium (Hf), indium (In), iridium (Ir), iron (Fe), manganese (Mn), molybdenum (Mo), nickel (Ni), niobium (Nb), osmium (Os), palladium (Pd), platinum (Pt), rhenium (Re), rhodium (Rh), ruthenium (Ru), scandium (Sc), silicon (Si), silver (Ag), tantalum (Ta), tin (Sn), titanium (Ti), vanadium (V), tungsten (W), ytterbium (Yb), yttrium (Y), zirconium (Zr), or combinations thereof. Illustrative examples of possible materials for the shell, the core or combinations thereof can independently include binary and/or ternary alloys including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative examples of possible materials for the shell, the core or combinations thereof can independently include lanthanides, actinides, or combinations thereof including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative examples of possible materials for the shell, the core or combinations thereof can independently include dispersions including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative examples of possible materials for the shell, the core or combinations thereof can independently include alloys or intermetallics based on or including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative alloys or intermetallics can include, for example binary and ternary silicides, nitrides, and carbides. For example vanadium silicide (VSi), niobium silicide (NbSi), tantalum silicide (TaSi), titanium silicide (TiSi), palladium silicide (PdSi) for example zirconium nitride (ZrN), aluminum nitride (AlN), tantalum nitride (TaN), hafnium nitride (HfN), titanium nitride (TiN), boron nitride (BN), niobium nitride (NbN), or combinations thereof. Illustrative carbides can include, for example silicon carbide (SiC), aluminum carbide (AlC), boron carbide (BC), zirconium carbide (ZrC), tungsten carbide (WC), titanium carbide (TiC) niobium carbide (NbC), or combinations thereof. Additionally doped oxides can also be utilized. Illustrative doped oxides can include aluminum oxide (AlO), silicon oxide (SiO), titanium oxide (TiO), tantalum oxide (TaO), yttrium oxide (YO), niobium oxide (NbO), cerium oxide (CeO), copper oxide (CuO), tin oxide (SnO), zirconium oxide (ZrO) or combinations thereof. Illustrative examples of possible materials for the shell, the core or combinations thereof can independently include conducting oxides, conducting nitrides or combinations thereof of various stoichiometries where one part of the oxide, nitride or carbide includes Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative examples of possible materials for the shell, the core or combinations thereof can independently include a metal including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr doped with oxide, carbide or nitride nanoparticles. Illustrative oxide nanoparticles can include, for example, oxides of yttrium (Y), lanthanum (La), barium (Ba), strontium (Sr), erbium (Er), zirconium (Zr), hafnium (Hf), germanium (Ge), silicon (Si), calcium (Ca), aluminum (Al), magnesium (Mg), titanium (Ti), cerium (Ce), tantalum (Ta), tungsten (W), thorium (Th), or combinations thereof. Illustrative nitride nanoparticles can include, for example, nitrides of zirconium (Zr), titanium (Ti), tantalum (Ta), aluminum (Al), boron (B), niobium (Nb), silicon (Si), indium (In), iron (Fe), copper (Cu), tungsten (W), or combinations thereof. Illustrative carbide nanoparticles can include, for example carbides of silicon (Si), aluminum (Al), boron (B), zirconium (Zr), tungsten (W), titanium (Ti), niobium (Nb), or combinations thereof. In some embodiments nanoparticles can include combinations of oxides, nitrides, or carbides. It is to be understood that lists of combinations of elements are not exclusive to monoatomic binary combinations, for example VSi is taken to include $V_2Si$ and $VSi_2$, for example.

In some embodiments, the material of the shell can have relatively good plasmonic properties. In some embodiments, materials that have ratio of absolute real permittivity/imaginary permittivity of greater than 10 may be suitable as a shell material. For example, at a wavelength of 830 nm, gold has real permittivity of −28 and imaginary permittivity of 2, and therefore the abovementioned ratio is 14, which is greater than 10, making gold a suitable shell material, materials that meet this criteria may be selected from the material below.

In some specific embodiments, the shell can include Au or an alloy of Au, for example. In some other specific embodiments the shell can include gold with inclusions of YO, ZrO, or combinations thereof.

In some embodiments, the material of the core can have relatively high hardness, relatively high melting point, relatively low diffusivity, relatively little diffusion in or with the shell material, or any combination thereof In some embodiments materials with melting temperatures above 1500° C. may be utilized in the core. In some embodiments, the material of the core can include, for example ruthenium (Ru), rhodium (Rh), iridium (Ir), palladium (Pd), platinum (Pt), molybdenum (Mo), tungsten (W), tantalum (Ta), cobalt (Co), or combinations thereof. In some embodiments, the material of the core can include, for example a cobalt iron (CoFe) alloy. In some embodiments, the core can include rhodium (Rh). In some embodiments the core can include tungsten (W). In some embodiments the core can include iridium (Ir).

Figure 12A:
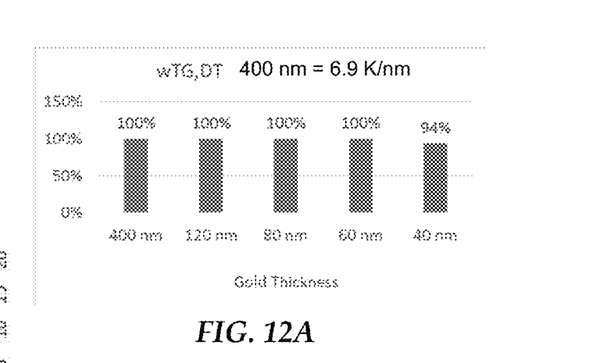
FIGS. 12A to 12C show modeling of systems such as that disclosed in FIGS. 11A to 11D designed to determine the effect of the thickness of the shell (t in FIG. 11C), with FIG. 12A showing the thermal gradient (wTG, DT) in degrees Kelvin per nanometer (K/nm), FIG. 12B showing the laser only peg temperature (in Kelvin (K)) and FIG. 12C showing the LDI or optical power required to heat the media beyond the Curie temperature.
Figure 12B:
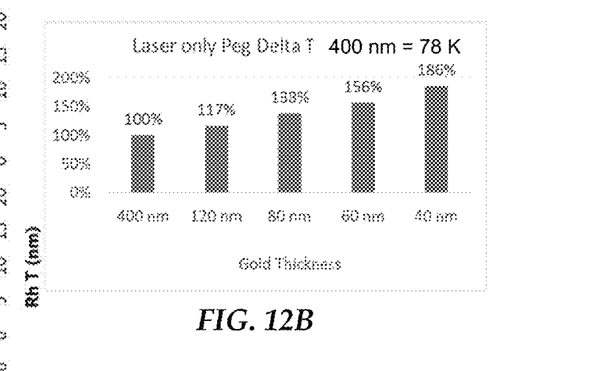
Figure 12C:
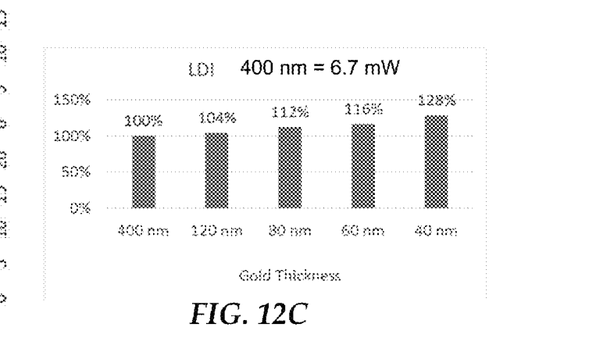

Embodiments that include a core and shell disc such as that disclosed in FIGS. 11A to 11D were modeled to determine the effect of the thickness of the shell (t in FIG. 11C). The results shown in FIGS. 12A to 12C are normalized to the same structure with a disc made entirely of gold (Au), which is shown as the first value (400 nm) e.g., 100% would be the same result obtained from such a structure. FIG. 12A shows the thermal gradient (wTG, DT) in degrees Kelvin per nanometer (K/nm) which is an indication of the areal density capability of a magnetic recording head including such a structure. In comparing the modeled results, it should be noted that higher wTG, DT implies a higher areal density capability. FIG. 12B shows the laser only peg temperature (in Kelvin (K)). In comparing the modeled results, it should be noted that lower temperatures are generally desired, e.g., values less than 100%. With regard to the temperature results, it is noted that additional interfaces would expectedly result in increased temperatures. FIG. 12C shows the LDI or optical power required to heat the media beyond the Curie temperature. Lower values of LDI (less than 100%) are generally preferred.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other Thus, embodiments of multipiece near field transducers (NFTs) are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A device having an air bearing surface (ABS), the device comprising:
   a near field transducer (NFT) comprising:
      a disc configured to convert photons incident thereon into plasmons; and
      a peg configured to couple plasmons coupled from the disc into an adjacent magnetic storage medium,
      wherein at least one of a portion of the peg, a portion of the disc, or a portion of both the peg and the disc comprises a multilayer structure comprising at least two layers comprising at least one layer of a first material and at least one layer of a second material, wherein the first material and the second material are not the same and wherein the first and the second materials independently comprise aluminum (Al), antimony (Sb), bismuth (Bi), boron (B), barium (Ba), calcium (Ca), cerium (Ce), chromium (Cr), cobalt (Co), copper (Cu), erbium (Er), gadolinium (Gd), gallium (Ga), germanium (Ge), gold (Au), hafnium (Hf), indium (In), iridium (Ir), iron (Fe), lanthanum (La), magnesium (Mg), manganese (Mn), molybdenum (Mo), nickel (Ni), niobium (Nb), osmium (Os), palladium (Pd), platinum (Pt), rhenium (Re), rhodium (Rh), ruthenium (Ru), scandium (Sc), silicon (Si), silver (Ag), strontium (Sr), tantalum (Ta), thorium (Th), tin (Sn), titanium (Ti), vanadium (V), tungsten (W), ytterbium (Yb), yttrium (Y), zirconium (Zr), or combinations thereof.

2. The device according to claim 1, wherein either the first material or the second material is selected from: dielectric materials comprising
   silicon (Si), silicon carbide (SiC), partially hydrogenated Si and/or SiC; or
   oxides, nitrides, carbides or fluorides of aluminum (Al), boron (B), barium (Ba), calcium (Ca), cerium (Ce), copper (Cu), erbium (Er), iron (Fe), germanium (Ge), hafnium (Hf), indium (In), lanthanum (La), magnesium (Mg), niobium (Nb), silicon (Si), strontium (Sr), tantalum (Ta), thorium (Th), titanium (Ti), tungsten (W), yttrium (Y), zirconium (Zr), combinations thereof; or combinations thereof.

3. The device according to claim 1, wherein the multilayer structure comprises at least a first layer positioned on top of the peg, closest to the disc and a second layer positioned on the bottom of the peg farthest from the disc.

4. The device according to claim 3, wherein the materials of the first layer and the second layer independently comprise rhodium (Rh), iridium (Ir), silver (Ag), copper (Cu), gold (Au), palladium (Pd), tungsten (W), ruthenium (Ru), platinum (Pt), palladium (Pd), molybdenum (Mo), cobalt (Co), tantalum (Ta), or combinations thereof.

5. The device according to claim 4, wherein the materials of the first layer or the second layer comprise gold (Au) with yttrium oxide (YO) nanoparticles, zirconium oxide (ZrO) nanoparticles, or some combination thereof.

6. The device according to claim 1, wherein the first layer, the second layer, or both independently have thicknesses from 3 Å to 40 nm.

7. The device according to claim 1, wherein the at least one portion of the peg, the disc, or both that comprises a multilayer structure is a portion of the peg located outside the footprint of the disc.

8. The device according to claim 1, wherein the at least one portion of the peg, the disc, or both that comprises a multilayer structure is a portion of the peg located outside the footprint of the disc and extending into the footprint of the disc.

9. The device according to claim 1, wherein the at least one portion of the peg, the disc, or both that comprises a multilayer structure is the disc.

10. The device according to claim 3 further comprising at least one additional layer of either the first material or the second material between the layer closest to the peg and the layer farthest from the peg.

11. The device according to claim 10, wherein there is one additional layer or two additional layers.

12. A device having an air bearing surface (ABS), the device comprising:
    a near field transducer (NFT) comprising:
       a disc configured to convert photons incident thereon into plasmons; and
       a peg configured to couple plasmons coupled from the disc into an adjacent magnetic storage medium,
       wherein at least a portion of the peg comprises a multilayer structure comprising at least two layers comprising at least a first layer of a first material and at least a second layer of a second material, wherein the first layer is positioned on top of the peg closest to the disc and the second layer is positioned on the bottom of the peg farthest from the disc, and wherein the first material and the second material are not the same and wherein the first and the second materials independently comprise aluminum (Al), antimony (Sb), bismuth (Bi), boron (B), barium (Ba), calcium (Ca), cerium (Ce), chromium (Cr), cobalt (Co), copper (Cu), erbium (Er), gadolinium (Gd), gallium (Ga), germanium (Ge), gold (Au), hafnium (Hf), indium (In), iridium (Ir), iron (Fe), lanthanum (La), magnesium (Mg), manganese (Mn), molybdenum (Mo), nickel (Ni), niobium (Nb), osmium (Os), palladium (Pd), platinum (Pt), rhenium (Re), rhodium (Rh), ruthenium (Ru), scandium (Sc), silicon (Si), silver (Ag), strontium (Sr), tantalum (Ta), thorium (Th), tin (Sn), titanium (Ti), vanadium (V), tungsten (W), ytterbium (Yb), yttrium (Y), zirconium (Zr), or combinations thereof.

13. The device according to claim 12, wherein the first material comprises gold and the second material comprises rhodium (Rh), iridium (Ir), or combinations thereof.

14. The device according to claim 12, wherein the first material comprises rhodium (Rh), iridium (Ir), or combinations thereof and the second material comprises gold (Au), silver (Ag), or combinations thereof.

15. The device according to claim 12, wherein the first material comprises gold (Au); and the second material comprises gold (Au) with inclusions of yttrium oxide (YO), zirconium oxide (ZrO), or combinations thereof.

16. The device according to claim 12, wherein the first material comprises copper and the second material comprises rhodium (Rh) doped gold (Au).

17. The device according to claim 12, wherein one of either the first material or the second material comprises gold (Au) and the other of the first material or the second material comprises tantalum oxide (TaO) or magnesium fluoride (MgF).

18. A device having an air bearing surface (ABS), the device comprising:
    a near field transducer (NFT) comprising:

a disc configured to convert photons incident thereon into plasmons and the disc comprising a core and a shell, wherein the core is peripherally surrounded by the shell, the core has a thickness around the periphery of the core and the core and the shell comprise different materials; and a peg configured to couple plasmons coupled from the disc into an adjacent magnetic storage medium.

19. The device according to claim 18, wherein the thickness of the shell around the periphery of the core is from 30 nm to 50 nm.

20. The device according to claim 18, wherein the shell comprises gold (Au); and the core comprises ruthenium (Ru), rhodium (Rh), iridium (Ir), palladium (Pd), platinum (Pt), molybdenum (Mo), tungsten (W), tantalum (Ta), cobalt (Co), or combinations thereof.

* * * * *